US007668891B2

(12) United States Patent
Guilford

(10) Patent No.: US 7,668,891 B2
(45) Date of Patent: Feb. 23, 2010

(54) ADJUSTABLE TIME ACCUMULATOR

(75) Inventor: John H. Guilford, Stanwood, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 902 days.

(21) Appl. No.: 11/199,786

(22) Filed: Aug. 9, 2005

(65) Prior Publication Data

US 2007/0038690 A1 Feb. 15, 2007

(51) Int. Cl.
*G06F 15/00* (2006.01)
*G06F 1/00* (2006.01)

(52) U.S. Cl. ....................................... 708/200; 713/500

(58) Field of Classification Search ................. 708/111, 708/200
See application file for complete search history.

(56) References Cited

U.S. PATENT DOCUMENTS 5,233,573 A * 8/1993 Bettelheim et al. .......... 368/113
5,767,747 A * 6/1998 Pricer .......................... 331/46
6,967,510 B2 * 11/2005 DeMent et al. ............. 327/141

FOREIGN PATENT DOCUMENTS

JP 3028793 2/1991

OTHER PUBLICATIONS

GB Search Report dated Oct. 30, 2006.

* cited by examiner

*Primary Examiner*—Chuong D Ngo

(57) ABSTRACT

A time accumulator is adjustable to provide sufficient calculation time regardless of the clock frequency. The time accumulator includes a first register storing a current time and a second register storing a time increment value corresponding to a multiplier multiplied by an original time increment associated with a clock pulse of a clock signal. The clock signal is divided into computation intervals, in which each computation interval includes a predetermined number of clock pulses equivalent to the value of the multiplier. The time accumulator further includes a summation node for adding the current time to the time value to produce an updated current time each computation interval.

23 Claims, 5 Drawing Sheets

ADJUSTABLE TIME ACCUMULATOR

BACKGROUND OF THE INVENTION

Time (or phase) accumulators are commonly used to track the current time in a digital circuit. A time accumulator operates by adding a time increment to the current time at a rate called the clock frequency. The time increment may be fixed, variable or time-varying. An example of a time-varying implementation is a servo-loop that is used to vary the time increment in order to keep the time accumulator in sync with an external time reference. The higher the clock frequency, the higher the resolution of the time accumulator and the more accurately the time accumulator can be used to time events. For example, a time accumulator can be used to set a timer value, record the time of an external event (i.e., a timestamp) or generate a trigger signal for an external event at a given time.

However, a higher clock frequency necessarily reduces the time available to calculate the addition of the time increment and any other operations that need to be performed on the time increment value (e.g., servo-loop calculations). If the time accumulator is implemented in a device that operates at a high clock frequency that does not allow enough time for the time accumulator to complete all of its calculations before the next clock, the current time recorded by the time accumulator may be inaccurate. Solutions to this problem include using faster hardware in the time accumulator or relaxing the accuracy requirements of the device and using a lower clock frequency, thereby giving the time accumulator more time between clock pulses in which to perform the calculations. However, faster hardware is usually more expensive and, in many applications, reducing the accuracy of the device may not be desirable. Therefore, there is a need for a slower time accumulator that is capable of operating at a high clock frequency.

SUMMARY OF THE INVENTION

Embodiments of the present invention provide an adjustable time accumulator capable of providing sufficient calculation time regardless of the clock frequency. The time accumulator includes a first register storing a current time and a second register storing a time increment value corresponding to a multiplier multiplied by an original time increment associated with a clock pulse of a clock signal. The clock signal is divided into computation intervals, in which each computation interval includes a predetermined number of clock pulses equivalent to the value of the multiplier. The time accumulator further includes a summation node for adding the current time to the time value to produce an updated current time each computation interval.

In one embodiment, the adjustable time accumulator further includes a counter for counting clock pulses in the clock signal to determine a clock state indicating a current number of counted clock pulses. The counter generates a clock enable signal to the first register when the current number of counted clock pulses is equal to the predetermined number of clock pulses. In response to receipt of the clock enable signal, the first register is clocked to output the current time to the summation node.

In one aspect of the invention, the time accumulator further includes first and second multiplexers. The first multiplexer selects between time options, in which each of the time option is a time value corresponding to an original time added to a respective multiple of the original time increment that is less than the multiplier. Upon receipt of a trigger signal, the counter generates a first select signal indicative of the clock state to the first multiplexer for selection of a select one of the time options associated with the clock state. In addition, the counter also generates a second select signal in a first state in absence of the trigger signal and in a second state upon receipt of the trigger signal. The second multiplexer stores the updated current time as the current time in the first register when the second select signal is in the first state and stores the selected time option as the current time in the first register when the second select signal is in the second state.

In another aspect of the invention, the time accumulator further includes a timestamp register connected to receive a trigger signal. In response to the trigger signal, the timestamp register stores the current time from the first register and the clock state from the counter as a timestamp.

In a further aspect of the invention, the time accumulator further includes a controller for generating a trigger signal based on status signals produced by respective comparators. Each of the status signals is indicative of a state of the current time relative to a respective trigger time. Each of the trigger times represents an original trigger time at a respective multiple of the original time increment less than the multiplier. The comparators produce their respective status signals in either a first state when the current time exceeds the respective trigger time or a second state when the current time precedes the respective trigger time. In an exemplary embodiment, the controller determines a clock state of the clock signal in a current computation interval from the number of status signals in the first state and generates the trigger signal at the clock pulse corresponding to the clock state in a subsequent computation interval.

BRIEF DESCRIPTION OF THE DRAWINGS

The disclosed invention will be described with reference to the accompanying drawings, which show exemplary embodiments of the invention and which are incorporated in the specification hereof by reference, wherein.

DETAILED DESCRIPTION OF THE EXEMPLARY EMBODIMENTS

Figure 1:
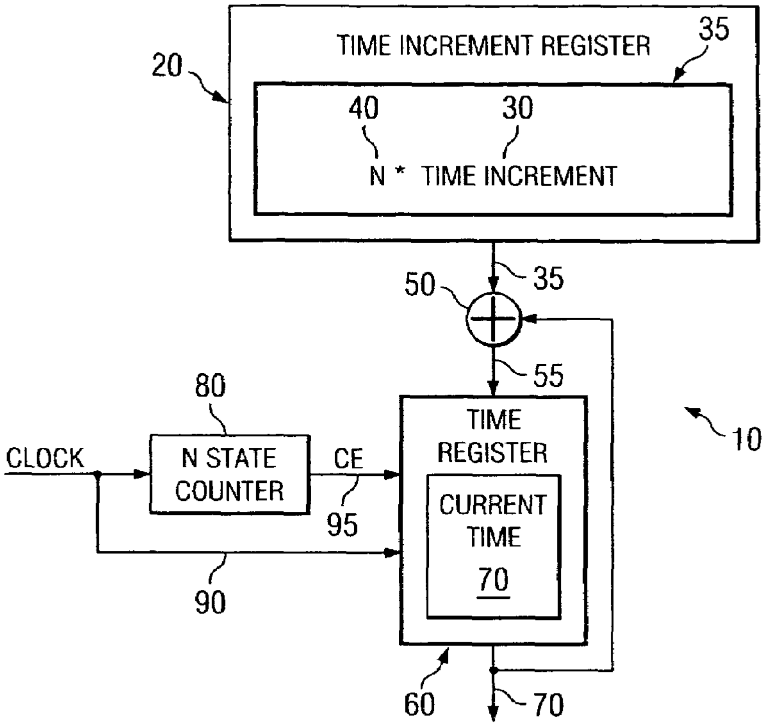
FIG. 1 is a schematic block diagram illustrating an adjustable time accumulator, in accordance with embodiments of the present invention.

FIG. 1 is a schematic block diagram illustrating an exemplary and simplified adjustable time accumulator 10, in accordance with embodiments of the present invention. The adjustable time accumulator 10 includes a time increment register 20, a summation node 50, a time register 60 and a counter 80. The time increment register 20 maintains a time increment value 35 that is added to a current time 70 by the summation node 50 to produce an updated current time 55. The updated current time 55 is stored in the time register 60 as the current time 70. The time register 60 outputs the current time 70 to the summation node 50 to update the current time 70 in synchronization with a clock signal 90.

The time increment value 35 is a multiple of an original time increment 30, in that the original time increment 30 is multiplied by a multiplier 40 to produce the time increment value 35. The original time interval 30 is the amount of time added to the current time each clock pulse, defined herein as a clock period (from one rising edge of the clock signal 90 to the next rising edge of the clock signal 90). The original time increment 30 corresponds to the time interval between successive clock pulses in the clock signal 90. For example, if the clock signal 90 produces a clock pulse every 10 nanoseconds (ns), the original time increment 30 is 10 ns. Thus, if the time accumulator 10 is capable of operating at the clock frequency of the clock signal 90, the value of the multiplier 40 is “1” to add 10 ns to the current time 70 each clock pulse.

However, if the time accumulator 10 runs at a slower rate than the clock frequency, the value of the multiplier 40 (N) is dependent upon the ratio between the clock period and the operating time of the time accumulator 10. For example, if the time accumulator 10 requires 20 nanoseconds (ns) to calculate and store the current time 70, and the clock period is 10 ns, the value of the multiplier 40 is two (N=2). Thus, the original time interval 30 is multiplied by two to produce the time increment value 35 of 20 ns (2*10 ns=20 ns) that is added to the current time 70. As a result, the time accumulator 10 is allowed to operate at 1/N * clock frequency, while still maintaining the timing resolution and accuracy provided by the clock frequency. In some embodiments, the value of the multiplier 40 may vary between current time updates depending upon the ratio of the clock period and the operating time of the time accumulator 10.

It should be understood that the clock frequency of the clock signal 90 is determined by the desired clock frequency of a device incorporating the time accumulator 10, and therefore, is dependent upon the application. In some embodiments, the value of the multiplier 40 may vary to synchronize the time accumulator 10 with a time-varying clock frequency. As described above, the value of the multiplier 40 is equal to the number of clock pulses of the clock signal 90 necessary for the time accumulator 10 to perform its calculations. This number of clock pulses is referred to herein as a computation interval. Thus, the time accumulator 10 updates the current time 70 once each computation interval.

The counter 80 counts the clock pulses of the clock signal 90 to determine a clock state indicating a current number of counted clock pulses. When the number of counted clock pulses is equal to the value of the multiplier 40, and therefore, a computation interval has passed, the counter 80 generates a clock enable signal 95 to the time register 60 that clocks the time register 60 by the clock signal 90. The time register 60 outputs the current time 70 to the summation node 50, which adds the current time 70 to the time increment value 35 and produces the updated current time 55 that is stored in the time register 60 as the new current time 70. Thus, the time accumulator 10 is updated every Nth clock pulse. In addition, once the counter 80 has generated the clock enable signal 95, the counter 80 is reset to begin counting clock pulses during the next computation interval.

Figure 2:
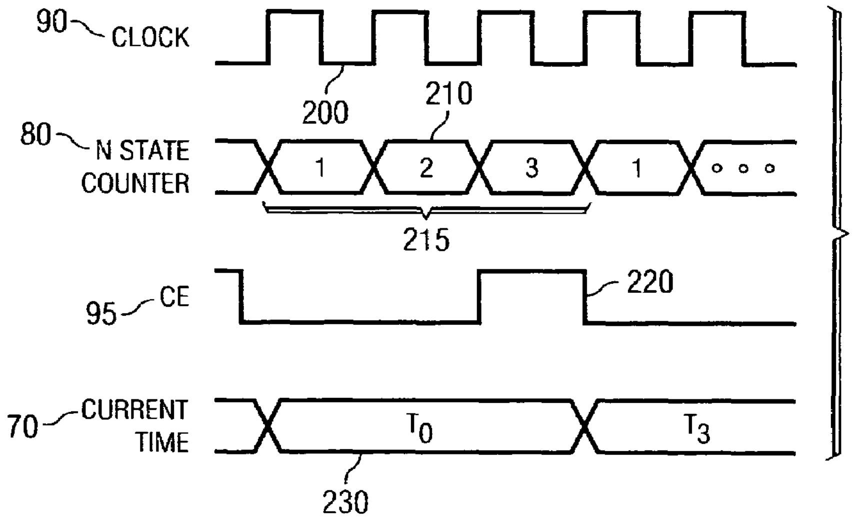
FIG. 2 illustrates timing diagrams of the operation of the adjustable time accumulator of FIG. 1, in accordance with embodiments of the present invention.

The operation of the adjustable time accumulator 10 of FIG. 1 is better understood when referring to the timing diagrams shown in FIG. 2. As can be seen in FIG. 2, the clock signal 90 includes clock pulses 200 separated by known time intervals such that the rising edge of each clock pulse 200 is received at a rate corresponding to the desired resolution. The counter value 210 is incremented each time the counter 80 detects a rising edge of a clock pulse 200 during a computation interval 215. Thus, the counter value 210 indicates the clock state of the clock signal 90, in which the clock state corresponds to the current number of counted clock pulses 200 in the clock signal 90. In FIG. 2, the computation interval 215 includes three clock pulses 200, and therefore, the counter value 210 is reset at the rising edge of the next clock pulse 200 following the third counted clock pulse 200.

Each counter value 210 (counted clock pulse) represents a different phase of the computation interval 215. By noting the phase of the computation interval 215, various timing operations can be performed at the clock frequency of the clock signal 90 even though the time accumulator 10 is only updated at 1/N * the clock frequency, as described in more detail below in connection with FIGS. 4-9.

The clock enable signal 95 is generated upon counting “N” clock pulses 200. For example, as shown in FIG. 2, the clock enable signal 95 is generated (shown generally at reference number 220) at the rising edge of the third counted clock pulse 200. When the clock enable signal 95 is generated, the current time 70 is updated. Since the computation interval 215 includes three clock pulses 200, the clock enable signal 95 is generated every three clock pulses 200 and the value 230 of the current time 70 is updated every three clock pulses 200. For example, as shown in FIG. 2, at an initial time, the value 230 of the current time 70 is updated from $T_0$ to $T_3$, such that the value of the current time 70 is $T_3$ at the end of the first computation interval 215. After three clock pulses 200, the value 220 of the current time 70 is updated again from $T_3$ to $T_6$, such that the value 220 of the current time 70 is $T_6$ at the end of the second computation interval 215.

Figure 3:
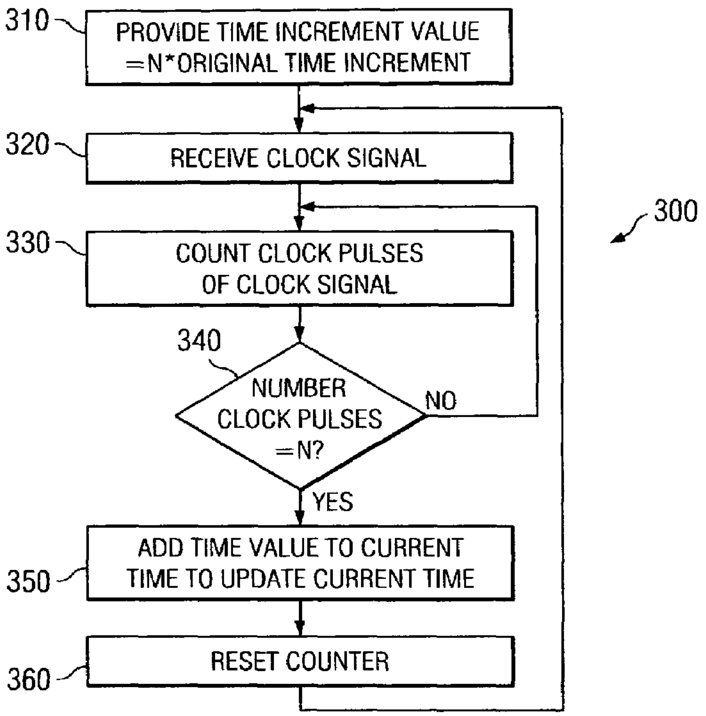
FIG. 3 illustrates an exemplary process for accumulating time, in accordance with embodiments of the present invention.

FIG. 3 illustrates an exemplary process 300 for accumulating time, in accordance with embodiments of the present invention. The process 300 begins at block 310, where a time increment value is determined from the multiplication of a multiplier with an original time interval. The original time interval is the amount of time needed to be added to the current time each clock pulse (clock period), and the multiplier is determined from the time required to perform the accumulation. For example, if a clock pulse occurs every 10 ns, and the accumulation time is 30 ns, the value of the multiplier is three. Thus, the original time interval (10 ns) is multiplied by three to produce the time increment value of 30 ns.

The process continues at block 320, where a clock signal is received at a clock frequency. Using the example described above, the clock frequency of a clock signal producing a clock pulse every 10 ns is 100 MHz. At block 330, the clock pulses of the clock signal are counted. For example, prior to receiving the clock signal, a counter is initialized to one. Once the clock signal is input to the counter, the counter is incremented by one at the rising edge of each clock pulse in the clock signal. Using the same example, if the time between rising edges of sequential clock pulses is 10 ns, the counter is incremented by one every 10 ns.

The process continues at block 340, where the current value of the counter is compared to a predetermined number of clock pulses equal to the value of the multiplier. If the current value of the counter is not equal to the value of the multiplier, the counter continues to count clock pulses. Using the same example, when the counter detects the rising edge of a first clock pulse in the clock signal, the counter is incremented to from one to two. Since the value of the multiplier is three, the counter continues counting clock pulses until the counter has counted three clock pulses.

Once the current value of the counter is equal to the value of the multiplier, at block 350, the time increment value determined at block 310 is added to a current time to update the current time. For example, if the current time is 30 ns, and the time value increment is 30 ns, at block 350, the current time is increased to 60 ns. At block 360, the counter is reset and the process repeats at block 320. Using the same example, if the updated current time from block 350 is 60 ns, and the value of the multiplier is still three, the counter counts three additional clock pulses in the clock signal at block 330, and after the three additional clock pulses, the current time is increased from 60 ns to 90 ns.

Figure 4:
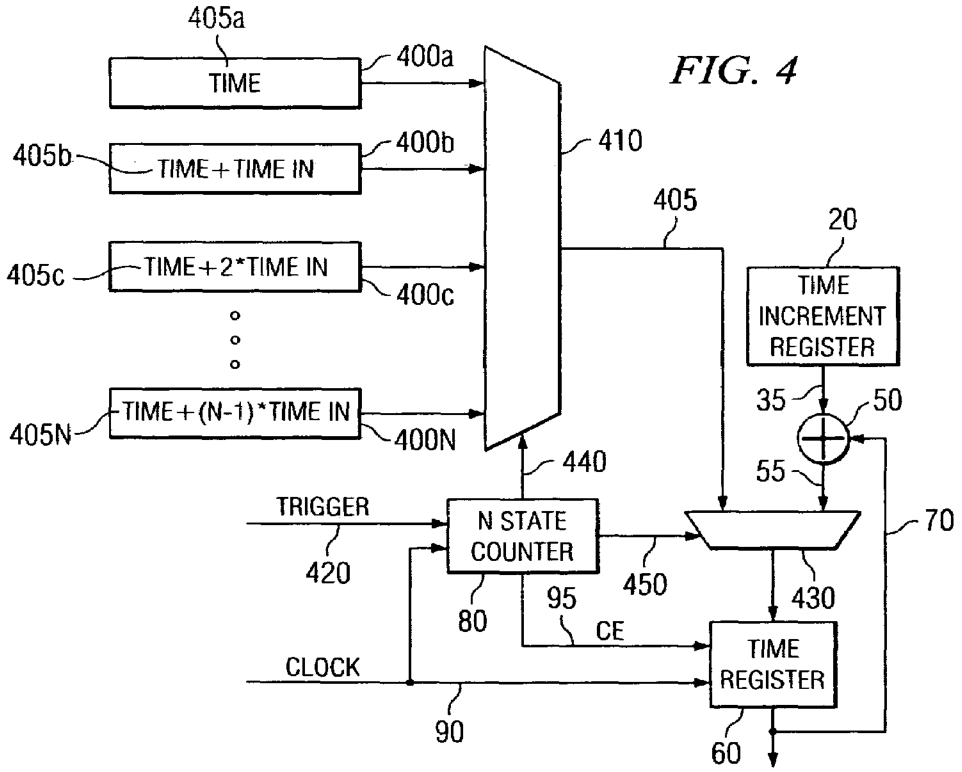
FIG. 4 is a schematic block diagram of an exemplary implementation of the adjustable time accumulator to set the time, in accordance with embodiments of the present invention.

FIG. 4 is a schematic block diagram of an exemplary implementation of the adjustable time accumulator 10, in accordance with embodiments of the present invention. In FIG. 4, the adjustable time accumulator 10 is used in conjunction with a trigger circuit (not specifically shown) to identify not only a new time to load into the time register 60, but also the phase in which the update should occur. As in FIG. 1, the time accumulator 10 includes the time increment register 20 storing the time increment value 35, the time register 60 storing the current time 70, the summation node 50 for adding the time increment value 35 to the current time 70 to produce the updated current time 55 and the counter 80 for counting the clock pulses of the clock signal 90.

The time accumulator 10 further includes a first multiplexer 410 and a second multiplexer 430. The first multiplexer 410 selects between time options 405*a*, 405*b*, 405*c* . . . 405N stored in registers 400*a*, 400*b*, 400*c* . . . 400N. Time option 405*a* stored in register 400*a* corresponds to a new time value loaded into the time accumulator to update the current time 70 of the time accumulator 10 at a particular time. Time options 405*b*, 405*c* . . . 405N stored in subsequent registers 400*b*, 400*c* . . . 400N are each one time interval apart, where the time interval refers to the amount of time between successive clock pulses in the clock signal 90. Thus, time option 405*b* stored in register 400*b* is equal to the new time value plus the time interval, time option 405*c* stored in register 400*c* is equal to the new time value plus two times the time interval and time option 405N stored in register 400N is equal to the new time value plus (N−1) times the time interval.

As described above, the counter 80 counts the clock pulses of the clock signal 90 to determine a clock state indicating a current number of counted clock pulses. The number of different clock states is equivalent to the number of clock pulses in the computation interval. Thus, each clock state (counted clock pulse) represents a different phase of the computation interval. The phase information is used to select one of the time options 405*a* . . . 405N stored in registers 400*a* . . . 400N to load into the time register 60 as the new current time 70.

More specifically, the counter 80 is connected to receive a trigger signal 420 to trigger loading of one of the time options 405*a* . . . 405N into the time register 60. When the counter 80 receives the trigger signal 420, the counter 80 generates a first select signal 440 indicative of the current clock state to the first multiplexer 410 to identify the particular time option 405*a* . . . 405N that the first multiplexer 410 should select. Each clock state corresponds to a particular time option 405*a* . . . 405N. For example, time option 405*a* corresponds to an initial clock state, time option 405*b* corresponds to a first clock state, time option 405*b* corresponds to a second clock state and time option 405N corresponds to an N clock state. As an example, if the first select signal 400 indicates that the current clock state is the second clock state, the first multiplexer 410 selects time option 405*c* stored in register 400*c*.

In addition to the clock enable signal 95 and the first select signal 440, the counter 80 also generates a second select signal 450 to the second multiplexer 430. The second select signal 450 has a first state when the counter 80 is not receiving the trigger signal 420 and a second state when the counter 80 is receiving the trigger signal 420. The second multiplexer 430 selects between the selected time option 405 provided by the first multiplexer 410 and the updated current time 55 provided by the summation node 50 and to store in the time register 60 as the new current time 70. The second multiplexer 430 selects and stores the updated current time 55 from the summation node 50 as the new current time 70 in the time register 60 when the second select signal 450 is in the first state. Likewise, the second multiplexer 430 selects and stores the selected time option 405 from the first multiplexer 410 as the new current time 70 in the time register 60 when the second select signal 450 is in the second state.

Figure 5:
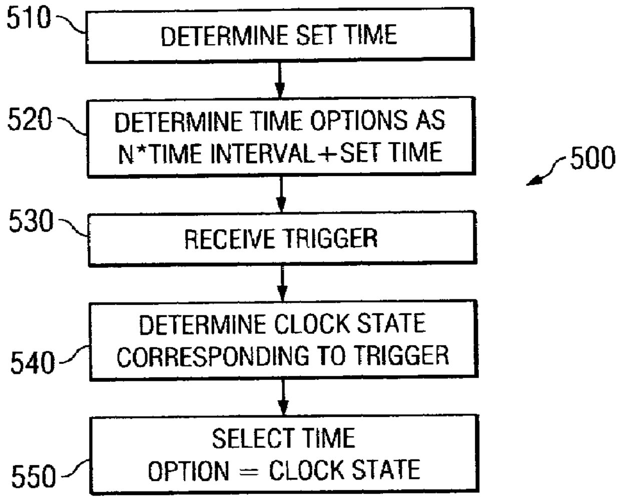
FIG. 5 illustrates an exemplary process for setting the time using an adjustable time accumulator, in accordance with embodiments of the present invention.

FIG. 5 illustrates an exemplary process 500 for setting the time using an adjustable time accumulator, in accordance with embodiments of the present invention. The process 500 begins at block 510, where a new time value is set and loaded into the adjustable time accumulator. At block 520, the time options for each phase are determined from the loaded new time value. Each time option starts with the new time value and adds to it a multiple (N) of the time interval between successive clock pulses of a clock signal, where $N \geqq 0$. For example, if there are three phases in a computation interval, the three time options can include the new time value, the new time value plus the time interval and the new time value plus twice the time interval.

The process continues at block 530, where a trigger signal is received at the time accumulator to trigger the loading of the new time value into the time accumulator. At block 540, the clock state (phase of the computation interval) at the time the trigger signal is received is determined, and at block 550, the time option corresponding to the current clock state is selected as the new time value loaded into the time accumulator. Using the example described above, if the current clock state at the time the trigger signal is received indicates that the clock signal is in the second phase of the computation interval, the second time option corresponding to the new time value plus the time interval is selected as the new current time for the time accumulator.

Figure 6:
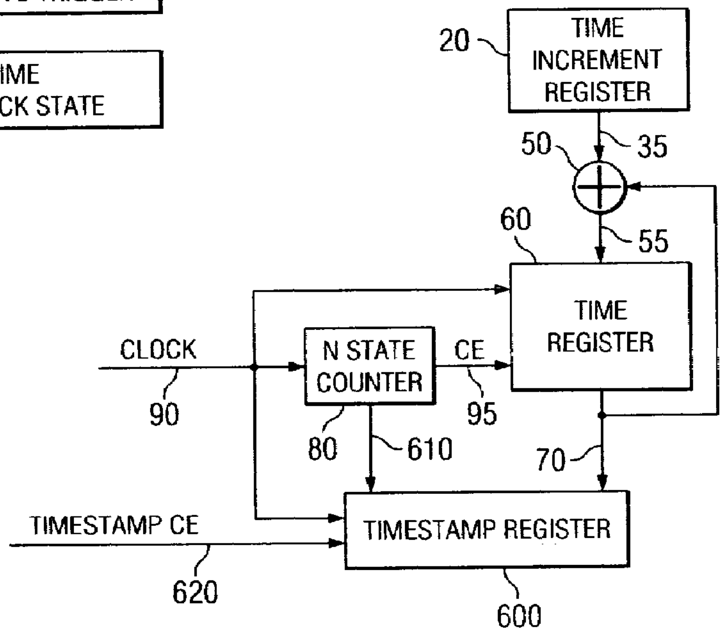
FIG. 6 is a schematic block diagram of an exemplary implementation of the adjustable time accumulator to record the time, in accordance with embodiments of the present invention.

FIG. 6 is a schematic block diagram of another exemplary implementation of the adjustable time accumulator 10, in accordance with embodiments of the present invention. In FIG. 5, the adjustable time accumulator 10 is used in conjunction with a trigger circuit (not shown) to record the time of an external event by creating a timestamp. As in FIG. 1, the time accumulator 10 includes the time increment register 20 storing the time increment value 35, the time register 60 storing the current time 70, the summation node 50 for adding the time increment value 35 to the current time 70 to produce the updated current time 55 and the counter 80 for counting the clock pulses of the clock signal 90.

The time accumulator 10 further includes a timestamp register 600 for creating and storing a timestamp. The timestamp register 600 is connected to receive the current time 70 from the time register 60 and a current clock state 610 from the counter 80. On each clock pulse, the counter 80 outputs the current clock state 610 (e.g., the number of counted clock pulses) to indicate the current phase of the computation interval. The phase information is used to allow the appropriate time increment to be added to the current time 70 in either hardware or software in order to produce a correct timestamp.

To generate a timestamp, an external event latches a copy of the time register 60 by sending a timestamp enable signal 620 to the timestamp register 600. When the timestamp register 600 receives the timestamp enable signal 620, the timestamp register 600 is clocked by the clock signal 90 to store both the current time 70 from the time register 60 and the current clock state 610 from the counter 80. The current time 70 in combination with the current clock state 610 form the timestamp.

Figure 7:
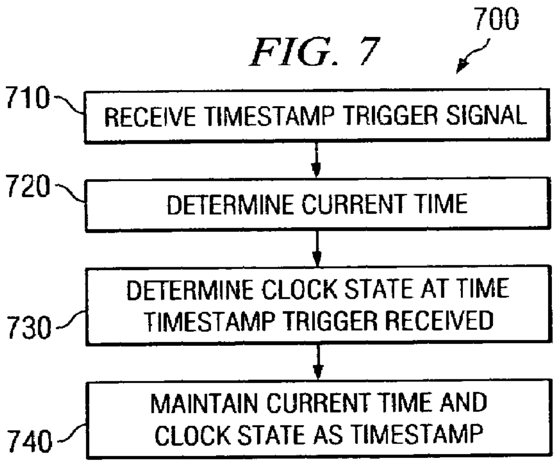
FIG. 7 illustrates an exemplary process for recording the time using an adjustable time accumulator, in accordance with embodiments of the present invention.

FIG. 7 illustrates an exemplary process 700 for recording the time using an adjustable time accumulator, in accordance with embodiments of the present invention. The process 700 begins at block 710, where a timestamp trigger signal is received by the adjustable time accumulator. The timestamp trigger signal is generated by an external event to record the time of the external event. The process continues at blocks 720 and 730, where both the current time of the adjustable time accumulator and the current clock state at the time of receipt of the timestamp trigger signal are determined. At block 740, the current time and current clock state are maintained as the requested timestamp for the external event. With knowledge of the current clock state, the actual (correct) timestamp can be determined (e.g., by adding a multiple of the time interval between successive clock pulses corresponding to the current clock state to the current time).

Figure 8A:
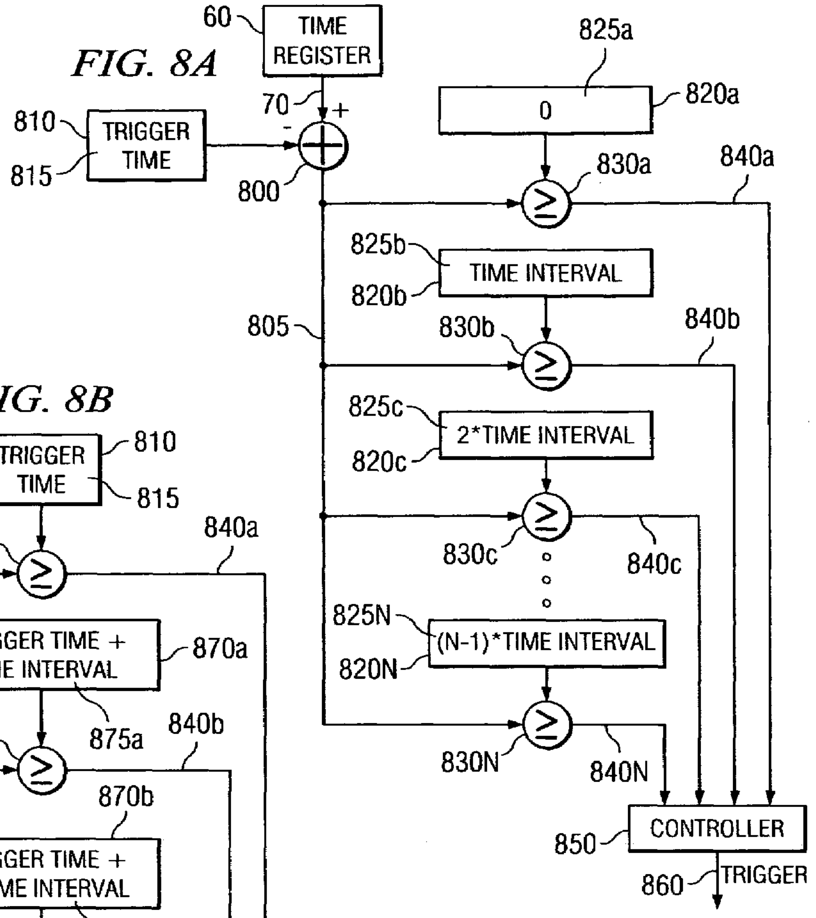
FIGS. 8A and 8B are schematic block diagrams of exemplary implementations of the adjustable time accumulator to generate a trigger, in accordance with embodiments of the present invention.
Figure 8B:
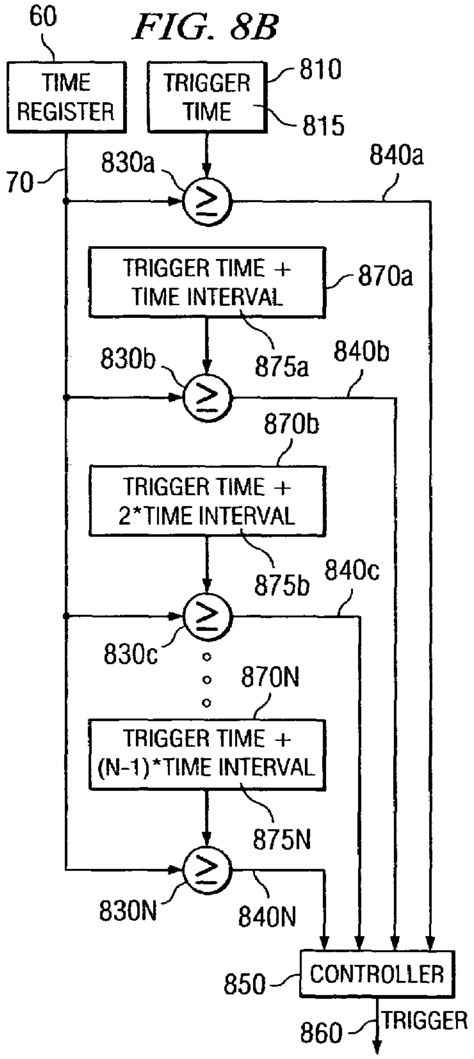

FIGS. 8A and 8B are schematic block diagrams of other exemplary implementations of the adjustable time accumulator, in accordance with embodiments of the present invention. In FIGS. 8A and 8B, the adjustable time accumulator 10 is used in generate a trigger signal to trigger an external event. Although not specifically shown in FIGS. 8A and 8B, as in FIG. 1, the time accumulator 10 includes the time increment register storing the time increment value, the time register 60 storing the current time 70, the summation node for adding the time increment value to the current time 70 to produce the updated current time and the counter for counting the clock pulses of the clock signal.

In FIG. 8A, the time accumulator 10 further includes a trigger register 810 storing a trigger time 815, a difference node 800 for determining a difference value 805 representing the difference between the current time 70 and the trigger time 815, registers 820*a*, 820*b*, 820*c* . . . 820N storing respective time interval values 825*a*, 825*b*, 825*c* . . . 825N, comparators 830*a*, 830*b*, 830*c* . . . 830N for comparing the respective time interval values 825*a*, 825*b*, 825*c* . . . 825N to the difference value 805 and a controller 850. Each of the comparators 830*a*, 830*b*, 830*c* . . . 830N produces a respective status signal 840*a*, 840*b*, 840*c* . . . 840N to the controller 850. Each of the status signals 840*a*, 840*b*, 840*c* . . . 840N is indicative of the state of the current time 70 relative to a respective inherent trigger time, in which each inherent trigger time represents the stored trigger time 815 at a respective multiple of the time interval between successive clock pulses, in which the multiple is between zero and the number of clock pulses in a computation interval (i.e., the multiplier value).

For example, each status signal 840*a*, 840*b*, 840*c* . . . 840N can either be in a first state when the current time 70 exceeds the respective inherent trigger time or a second state when the current time 70 does not exceed the respective inherent trigger time. Based on the number of status signals 840*a*, 840*b*, 840*c* . . . 840N in the first state, the controller 850 determines the current clock state of the clock signal in a current computation interval. The controller 850 generates the trigger signal 860 at the clock pulse corresponding to the determined clock state in a subsequent computation interval.

In one embodiment, each comparator 830*a*, 830*b*, 830*c* . . . 830N compares the respective time interval value 825*a*, 825*b*, 825*c* . . . 825N to the difference value 805 to determine whether the difference value 805 is less than or equal to the respective time interval value 825*a*, 825*b*, 825*c* . . . 825N. If the difference value 805 is less than or equal to at least one of the time interval values 825*a*, 825*b*, 825*c* . . . 825N, the controller 850 generates the trigger signal 860 in the next computation interval at a clock pulse determined from the number of status signals 840*a*, 840*b*, 840*c* . . . 840N that indicate that the difference value 805 is less than the respective time interval value 825*a*, 825*b*, 825*c* . . . 825N.

As an example, if there are four clock pulses in a computation interval, and each clock pulse is 10 ns, the first time interval value 825*a* is zero, the second time interval value 825*b* is ten, the third time interval value 825*c* is twenty and the fourth time interval value 825N is thirty. If the trigger time 815 is set to 62 ns and the current time is 80 ns, the difference value 805 is 18 ns, and the first comparator 830*a* would output a status signal 840*a* indicating that the difference value 805 is greater than zero, the second comparator 830*b* would output a status signal 840*b* indicating that the difference value is greater than ten, the third comparator 830*c* would output a status signal 840*c* indicating that the difference value is less than twenty and the fourth comparator 830N would output a status signal 840N indicating that the difference value is less than thirty.

With two of the comparators (comparators 830*c* and 830N) producing status signals 840*c* and 840N indicating that the difference value 805 is less than or equal to the respective time interval values 825*c* and 825N, the controller 850 determines that the trigger signal 860 should be in the second phase of the computation interval. The controller 850 then generates the trigger signal 860 in the second phase of the next computation interval. As another example, if all four comparators 830*a*, 830*b*, 830*c* . . . 830N produced status signals 840*a*, 840*b*, 840*c* . . . 840N indicating that the difference value is less than or equal to the respective time interval values 825*a*, 825*b*, 825*c* . . . 825N, the controller 850 would determine that the trigger signal 860 should be in the first phase of the computation interval. As a further example, if only one comparator 830N produced a status signal 840N indicating that the difference value is less than or equal to the respective time interval value 825N, the controller 850 would determine that the trigger signal 860 should be in the fourth phase of the computation interval.

In FIG. 8B, the time accumulator 10 further includes a register 810 storing the original trigger time 815, registers 870*a*, 870*b* . . . 870N storing respective trigger time interval values 875*a*, 875*b* . . . 875N, each representing the original trigger time 815 added to a multiple of the time interval between successive clock pulses, in which the multiple is between 0 and the multiplier value (N−1), comparators 830*a*, 830*b*, 830*c* . . . 830N for comparing the respective trigger time interval values 815, 875*a*, 875*b* . . . 875N to the current time 70 and the controller 850. As in FIG. 8A, each of the comparators 830*a*, 830*b*, 830*c* . . . 830N produces a respective status signal 840*a*, 840*b*, 840*c* . . . 840N to the controller 850 indicative of the state of the current time 70 relative to the trigger time interval values 815, 875*a*, 875*b* . . . 875N.

For example, in one embodiment, each comparator 830*a*, 830*b*, 830*c* . . . 830N compares the respective trigger time interval value 815, 875*a*, 875*b* . . . 875N to the current time 70 to determine whether the current time 70 is greater than or equal (reached or past) to the respective trigger time interval value 815, 875*a*, 875*b* . . . 875N. If the current time 70 is greater than or equal to at least one of the trigger time interval values 875*a*, 875*b* . . . 875N, the controller 850 generates the trigger signal 860 in the next computation interval at a clock pulse determined from the number of status signals 840*a*, 840*b*, 840*c* . . . 840N that indicate that the current time 70 is less than the respective trigger time interval value 815, 875*a*, 875*b* . . . 875N.

Figure 9:
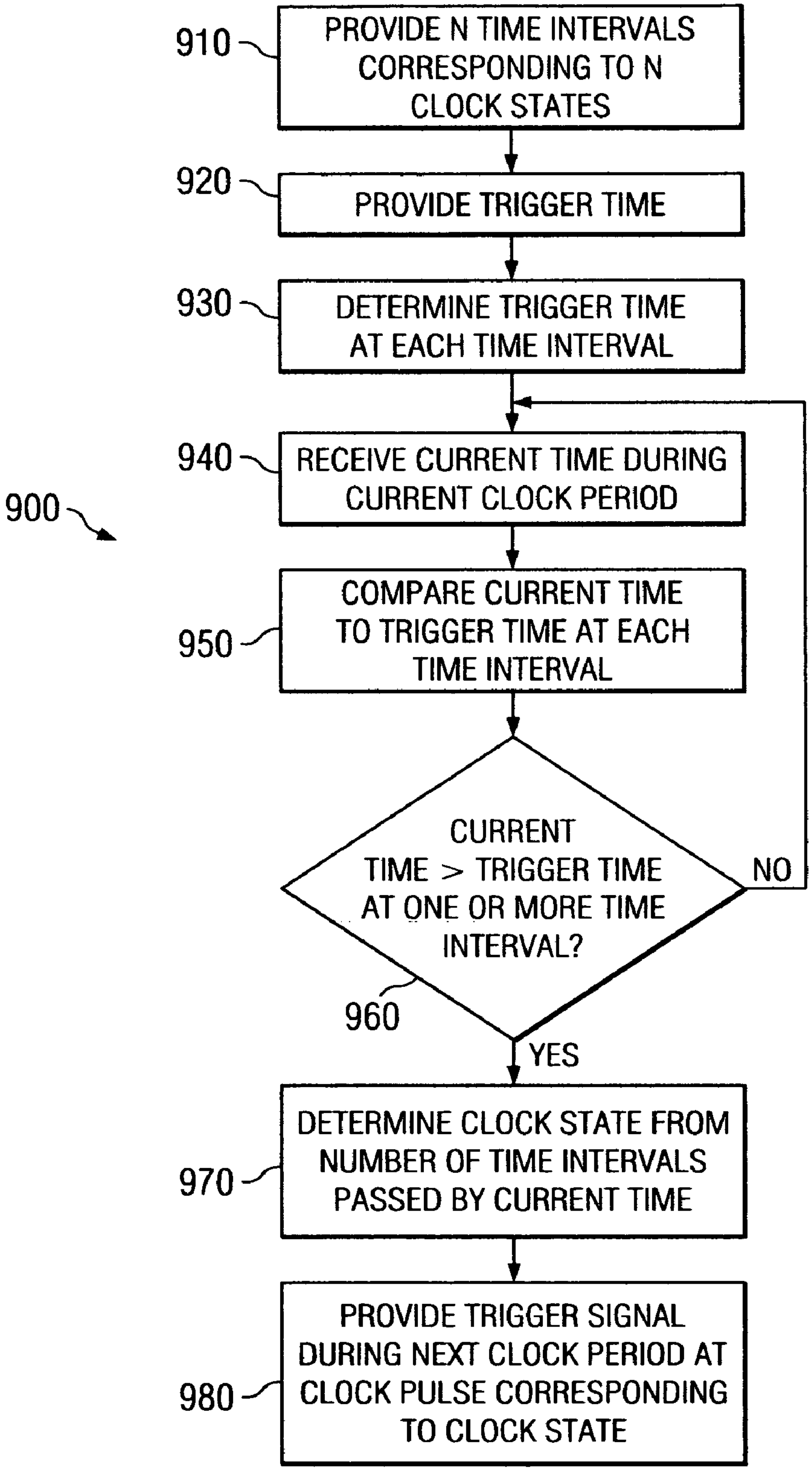
FIG. 9 illustrates an exemplary process for generating a trigger using an adjustable time accumulator, in accordance with embodiments of the present invention.

FIG. 9 illustrates an exemplary process 900 for generating a trigger using an adjustable time accumulator, in accordance with embodiments of the present invention. The process 900 begins at block 910, where a number (N) of time interval values are provided corresponding to the number of clock states of a computation interval. Each time interval value is a multiple of a time interval between successive clock pulses, in which the multiple is between zero and the number of clock pulses in the computation interval (i.e., the multiplier value). The process continues at blocks 920 and 930, where a trigger time is provided and the trigger time corresponding to each time interval value is determined. For example, in one embodiment, the trigger time corresponding to each time interval value is represented by the time interval value itself. In another embodiment, the trigger time corresponding to each time interval value is the trigger time added to the respective time interval value.

The process continues at block 940, where the current time is received during a current computation interval. At block 950, the current time is compared to the trigger time corresponding to each time interval value. For example, in one embodiment, the difference between the trigger time and the current time is determined, and this difference is compared to the time interval values themselves. In another embodiment, the current time is compared to the trigger time added to each time interval value.

At block 960, a decision is made whether the current time is greater than the trigger time corresponding to one or more of the time interval values. If not, the process repeats at block 940 to receive a new current time. If so, the process continues at block 970, where the current clock state of the clock signal in the current computation interval is determined based on the number of trigger times corresponding to time interval values that are greater than the current time. The process then continues at block 980, where a trigger signal is generated in the next computation interval at the clock pulse corresponding to the determined clock state.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A time accumulator, comprising:

a first register storing a current time;

a second register storing a time increment value corresponding to a multiplier multiplied by an original time increment associated with a clock pulse of a clock signal; and a summation node connected to receive said current time, said time increment value and said clock signal and operable to add said current time to said time increment value to produce an updated current time and store said updated current time in said first register as said current time each computation interval; wherein each said computation interval includes a predetermined number of clock pulses of said clock signal equivalent to said multiplier.

2. The time accumulator of claim 1, further comprising: a counter connected to receive said clock signal and operable to count clock pulses in said clock signal to determine a clock state indicating a current number of counted clock pulses.

3. The time accumulator of claim 2, wherein said counter is further operable to generate a clock enable signal to said first register when said current number of counted clock pulses is equal to said predetermined number of clock pulses, said clock enable signal clocking said first register with said clock signal.

4. The time accumulator of claim 3, wherein said first register is operable to output said current time to said summation node upon receipt of said clock signal.

5. The time accumulator of claim 2, wherein said counter is reset when said current number of counted clock pulses is equal to said predetermined number of clock pulses.

6. The time accumulator of claim 2, further comprising: a first multiplexer connected to receive time options and select between said time options, each of said time options including a respective time value corresponding to an original time added to a respective multiple of said original time increment, each said respective multiple being equal to or less than said multiplier.

7. The time accumulator of claim 6, wherein said counter is connected to receive a trigger signal and, in response to said trigger signal, is further operable to generate a first select signal indicative of said clock state to said first multiplexer for selection of a select one of said time options associated with said clock state.

8. The time accumulator of claim 7, wherein said counter is further operable to generate a second select signal in a first state in absence of said trigger signal and in a second state upon receipt of said trigger signal.

9. The time accumulator of claim 8, further comprising: a second multiplexer connected to receive said selected time option from said first multiplexer, said updated current time from said summation node and said second select signal from said counter, said second multiplexer being operable to store said updated current time as said current time in said first register when said second select signal is in said first state and to store said selected time option as said current time in said first register when said second select signal is in said second state.

10. The time accumulator of claim 2, further comprising: a timestamp register connected to receive said current time from said first register, said clock state from said counter and a trigger signal, said timestamp register being operable to store said current time and said clock state as a timestamp upon receipt of said trigger signal.

11. The time accumulator of claim 1, further comprising: a controller connected to receive status signals, each indicative of a state of said current time relative to a respective trigger time, each said respective trigger time representing an original trigger time at a respective multiple of said original time increment equal to or less than said multiplier, said controller being operable to generate a trigger signal based on said status signals.

12. The time accumulator of claim 11, further comprising: a respective comparator for each of said respective trigger times, each for producing said respective status signal in either a first state when said current time exceeds said respective trigger time or a second state when said current time precedes said respective trigger time.

13. The time accumulator of claim 12, wherein said controller is further operable to determine a clock state of said clock signal from a number of said status signals in said first state and to generate said trigger signal at said clock pulse corresponding to said clock state in a subsequent computation interval.

14. The time accumulator of claim 12, wherein each said respective trigger time includes an original trigger time added to said respective multiple of said original time increment.

15. In a time accumulator comprising: a first register storing a current time; a second register storing a time increment value corresponding to a multiplier multiplied by an original time increment associated with a clock pulse of a clock signal; and a summation node connected to receive said current time, a method for accumulating time, the method comprising:

providing a time increment value corresponding to a multiplier multiplied by said original time increment associated with said clock pulse of said clock signal; receiving said clock signal;

counting clock pulses of said clock signal; and adding said time increment value to said current time to produce an updated current time as said current time when a current number of counted clock pulses of said clock signal is equal to a predetermined number of clock pulses of said clock signal equivalent to said multiplier.

16. The method of claim 15, further comprising: resetting said current number of counted clock pulses of said clock signal when said current number of counted clock pulses is equal to said predetermined number of clock pulses.

17. The method of claim 15, further comprising: providing time options, each of said time options including an original time added to a respective multiple of said original time increment, each said respective multiple being equal to or less than said multiplier; receiving a trigger signal; in response to said trigger signal, generating a first select signal indicative of said current number of counted clock pulses; and selecting a select one of said time options associated with said current number of counted clock pulses.

18. The method of claim 17, further comprising: generating a second select signal in a first state in absence of said trigger signal and in a second state upon receipt of said trigger signal; selecting said updated current time as said current time when said second select signal is in said first state; and selecting said selected time value as said current time when said second select signal is in said second state.

19. The method of claim 15, further comprising: receiving a trigger signal; and in response to said trigger signal, producing a timestamp with said current time and said current number of counted clock pulses of said clock signal.

20. The method of claim 15, further comprising: receiving status signals, each indicative of a state of said current time relative to a respective trigger time, each said respective trigger time representing an original trigger time at a respective multiple of said original time increment equal to or less than said multiplier; and generating a trigger signal based on said status signals.

21. The method of claim 20, further comprising: producing said respective status signal in either a first state when said current time exceeds said respective trigger time or a second state when said current time precedes said respective trigger time.

22. The method of claim 21, wherein said generating said trigger signal further includes: determining a clock state of said clock signal from a number of said status signals in said first state; and generating said trigger signal at said clock pulse corresponding to said clock state in a subsequent computation interval.

23. The method of claim 21, wherein each said respective trigger time includes an original trigger time added to said respective multiple of said original time increment.

* * * * *